United States Patent [19]
Sandor

[11] Patent Number: 5,354,108
[45] Date of Patent: Oct. 11, 1994

[54] REINFORCED PIPE COUPLING

[75] Inventor: Joseph J. Sandor, Lawrenceville, Pa.

[73] Assignee: Ward Manufacturing, Inc., Blossburg, Pa.

[21] Appl. No.: 27,010

[22] Filed: Mar. 5, 1993

[51] Int. Cl.$^5$ .................................... F16L 23/032
[52] U.S. Cl. .................................... 285/414; 285/415
[58] Field of Search ............... 285/411, 412, 413, 414, 285/415, 367, 368

[56] References Cited

U.S. PATENT DOCUMENTS

| | | | |
|---|---|---|---|
| 1,928,316 | 9/1933 | Muto | 285/194 |
| 2,115,670 | 4/1938 | Merrill | 285/413 |
| 2,417,741 | 3/1947 | Dillon | 285/367 X |
| 3,695,638 | 10/1972 | Blakeley | 285/112 |
| 4,336,959 | 6/1982 | Roche | 285/415 |
| 4,417,755 | 11/1983 | Gittleman | 285/373 |
| 4,568,112 | 2/1986 | Bradley, Jr. et al. | 285/415 X |
| 4,611,839 | 9/1986 | Rung et al. | 285/367 |
| 4,639,020 | 1/1987 | Rung et al. | 285/367 |
| 5,058,931 | 10/1991 | Bowsher | 285/112 |
| 5,190,324 | 3/1993 | Bird et al. | 285/368 X |

FOREIGN PATENT DOCUMENTS 0179450  8/1954  Austria .................................. 285/415

Primary Examiner—Randolph A. Reese
Assistant Examiner—Heather Chun
Attorney, Agent, or Firm—Eckert Seamans Cherin & Mellott

[57] ABSTRACT

A pipe coupling having a pair of opposed, semi-circular collar halves to be attached via fasteners for clamping the halves together on abutting ends of collinear pipes. The pipe ends have circumferential grooves engaged by ridges on an inside of collar half. A pair of parallel reinforcing wings extend radially by a varying height on an outside of the collar halves, along the axial edges, providing rigidity and strength to the pipe coupling. The wings increase in radial height from the circumferential ends adjacent the tabs to a maximum at the center of the coupling. The wings thereby distribute unequal forces, which are concentrated at the center, to achieve equally distributed deformation with such forces, thereby reducing the possibility of the ridges disengaging the grooves due to concentration of deformation at a local area.

14 Claims, 2 Drawing Sheets

REINFORCED PIPE COUPLING

BACKGROUND OF THE INVENTION

1. Field of the Invention

This invention relates to the field of couplings for joining abutting ends of substantially collinear lengths of pipe or the like, and more particularly to a coupling of this type that is reinforced in a particular manner. Two members, each defining half of the circumference of the joined pipes, are bolted together on diametrically opposite sides of the pipes at their abutment. A pair of parallel wings that have a non-uniform radial height depend from, and essentially completely traverse axial boundaries of the outer side of said collar half, for reinforcing the coupling.

2. Description of the Related Art

Couplings for joining end-to-end pipes are known in some variations, and typically involve two semicircular members that are placed around the two pipes and are urged together by fasteners in bolting pads that are integral with the semicircular members. The structure forms a two part collar that bears radially inwardly on the two pipes, while bridging axially over the respective pipes on both sides of the abutment. Although this structure is basically uncomplicated, there are a number of aspects of the structure that present practical problems. For example, the fasteners are typically bolts that extend through the bolting pads, which extend radially of the pipes and parallel to the bolting pad of an opposed joint member. As torque is exerted to draw the bolting pads together, the joint members can be deformed from a nominally semicircular shape conforming to the pipe.

The couplings can have coupling tangs extending inwardly toward the pipes, for engaging circumferential grooves adjacent the ends of the pipes. Similarly, the pipes can be flanged. Misalignment of these parts may warp the coupling members and allow the coupling to slip. A heavily reinforced coupling part better resists deformation, but is heavy and may waste material, and can be counterproductive because the added stiffness is such that the coupling part cannot readily deform to accommodate a pipe that does not precisely match its dimensions.

The force exerted by bolts in the coupling tabs at the ends of the clamping parts along the lateral sides of the pipe, is a force exerted parallel to a diameter of the pipe. To accommodate the possibility that the pipe may be slightly oversized or the clamp slightly undersized relative to one another, it is advantageous to provide sufficient clearance and flexibility to allow the semicircular shape of the pipe to flex open. Conversely if the pipe is oversized and/or the clamp undersized, flexibility allowing the clamp halves to pull in on the pipe improves contact between the pipe and the clamp near the bolt tabs. Thus, there are advantages to providing a coupling that is flexible in certain aspects, for example to better conform to the pipes and to permit a limited ability to flex. Thus an optimal design may be the result of trade-offs and design choices that impact the effectiveness of the coupling.

U.S. Pat. No. 1,928,316—Muto discloses a two part coupling for conduits, having a hinge joint on one lateral side of adjoining conduit or pipe ends, instead of a pair of bolting pads. On the opposite side of the pipe, the bolting pads are urged together by a bolt, for clamping the hinge parts together and thereby joining the ends of the pipe. Muto includes stiffening ribs extending in diminishing size from a clamp edge to a point approximately three-quarters around the clamp body.

U.S. Pat. Nos. 4,611,839 and 4,639,020, each to Rung et al, disclose two-part couplings having reinforcing flanges or buttresses for controlling flexing and bending of the bolting pads. However, as shown in each of the Rung et al references, the reinforcing buttresses and flanges do not continue around the full circumference portion encompassed by the coupling part.

U.S. Pat. No. 5,058,931—Bowsher discloses a circumferential pipe clamp having a raised shoulder on each edge throughout the length of the clamp. The raised shoulder is the same height throughout its length.

U.S. Pat. No. 4,17,755—Gittleman discloses a pipe coupling having annular ribs adjacent annular grooves. The annular ribs have a uniform height around the circumference portion encompassed by the coupling part.

U.S. Pat. No. 3,695,638—Blakeley discloses a pipe coupling having wings located near an end of the coupling. The wings do not continue around the circumference portion encompassed by the coupling part.

The foregoing patent references suggest that the art of clamp-like pipe couplings is well developed. However, the references do not suggest that it would be advantageous to reinforce a pipe coupling by varying the extent of the reinforcement provided by parallel wings located laterally of the coupling parts (at the axial boundaries of the coupling with respect to the pipes), such that the wings are of a different radial height from point to point along the length of the coupling, that is of differing radial height along the circumference encompassed by each of the coupling halves. According to the invention, a pipe coupling has a pair of parallel wings integral with the coupling halves, protruding radially at the lateral edges or boundaries around the portion of the semicircular arc encompassed by each coupling part or half. The wings have a relative minimum height at points spaced from the axial centerline of the pipe, and gradually increase in size towards the centerline or midpoint between the bolt tabs of the clamp, and the wings are largest at this midpoint.

The wings provide maximum reinforcement against flexing of the clamping parts where the wings are radially highest, and this occurs at the greatest distance from the bolt tabs at the ends of the coupling parts. This variation in the reinforcement and rigidity of the pipe joint members produces a dynamic balance when the opposed clamp halves are bolted together or similarly urged inwardly against the pipe ends at the coupling, and provides an optimal balance between strength and the ability to flex.

SUMMARY OF THE INVENTION

The invention is a pair of arcuate collar halves which are secured together at their radial, terminal ends with a nut and bolt combination or the like. The collar halves may be relatively inexpensively made by casting in a substantially semi-circular or arcuate configuration, the inside of which complements the outer diameter of pipe ends to be coupled. The collar halves are oppositely disposed about endwise abutting pipe sections to couple the pipe sections together, and appropriate seals can be disposed between the collar halves and the pipes.

Each of the collar halves has a pair of tabs disposed at the opposite ends of the halves, arranged to extend laterally beyond the pipe. The tabs are arranged to secure the two halves together on the pipes, for example having bolt holes that are aligned when the halves are in position and receive a nut and bolt for drawing together the tabs of the opposed halves.

On the inner side of each clamping half are two parallel ridges or tangs, defining between them an internal recess in the body of the collar half. The parallel ridges are adapted to engage a groove on each of the respective pipe ends. The edge/groove interaction provides a locking of the pipe coupling to the adjoining pipe ends to prevent the pipe from slipping out of the coupling.

Because the pipe ends are essentially locked into the pipe coupling by engagement of the tangs and the grooves in the pipe ends, the pipe coupling is exposed to significant force transferred from bending and torque forces present at the pipe joint. The forces present at the pipe joint can be sufficient to deform known pipe couplings. The pipe coupling of the invention, however, includes a pair of parallel wings located along the axial boundaries of the outside of the coupling halves along substantially the full circumferential length spanned by each of the coupling halves. The wings add rigidity to the coupling to withstand bending and torque forces while retaining flexibility needed to best conform to the dimensions of the pipes.

The stresses applied to a clamping pipe joint as described are generally not equally distributed over the radial length of the coupling. For example, lever-like forces on the bolt tabs are produced by tightening the bolts, which necessarily are disposed at the ends of the clamping halves in order to clear the pipes. The ends are buttressed or thickened for extra reinforcement, but the result of such reinforcement is to transfer more deforming force to the center of the coupling.

According to the invention, however, the reinforcing wings are radially lowest at a point adjacent the collar halves and gradually increase in height towards a maximum height at the center of the collar. The lateral thickness of the wings in a direction axial of the pipes can be varied to achieve this variation in the extent of reinforcement against flexing. The wings are largest at the center of the collar half to achieve the greatest reinforcement there, and decrease in size toward the circumferential ends.

The unique design of the collar halves of the invention provides extra reinforcement to the middle of the collar and effectively redistributes forces on the collar half such that deformation occurs substantially equally throughout the circumferential length of the collar even though dynamic local deforming forces occurring in the collar half which are the natural results of external forces acting do not. The wing thus provides a dynamic local deforming equality of deformation via distribution local deforming forces and prevent any discrete section of a collar half from unduly deforming and causing a failure of the pipe joint.

It is an object of the invention to provide an optimal split pipe coupling comprised of oppositely disposed collar halves for joining adjoining ends of pipes.

It is also an object of the invention to vary the reinforcement of a clamping pipe coupling in a manner that is inversely related to variations in local deforming forces occurring in use, for distributing the deforming forces in a manner that best withstands forces on the coupling.

It is another object of this invention to provide oppositely disposed collar halves with a pair of parallel wings located on each of the axial boundaries of an outside of a coupling half along the semi-circumferential length of the coupling, wherein the wings are relatively smaller, preferably lowest in radial height, at the circumferential ends of the coupling and gradually and uniformly increase in size to a point at the center of the coupling to dynamically equalize deformation from unequal local forces applied to the pipe coupling, and thereby to prevent deformation or damage to the coupling.

BRIEF DESCRIPTION OF THE DRAWINGS

The drawings and subsequent discussion illustrate exemplary embodiments for better understanding of the invention, including the best mode presently contemplated for carrying out the invention, and in the drawings.

DETAILED DESCRIPTION OF THE PREFERRED EMBODIMENTS

Figure 1:
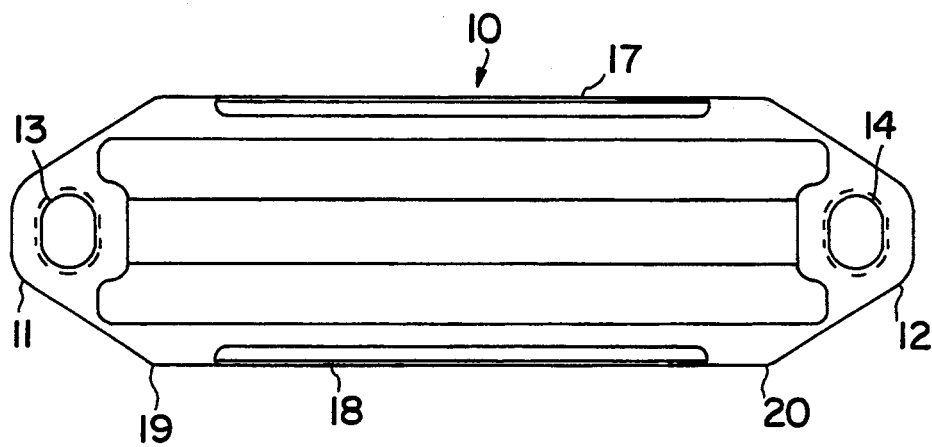
FIG. 1 is a top plan view of a coupling half according to the invention.
Figure 2:
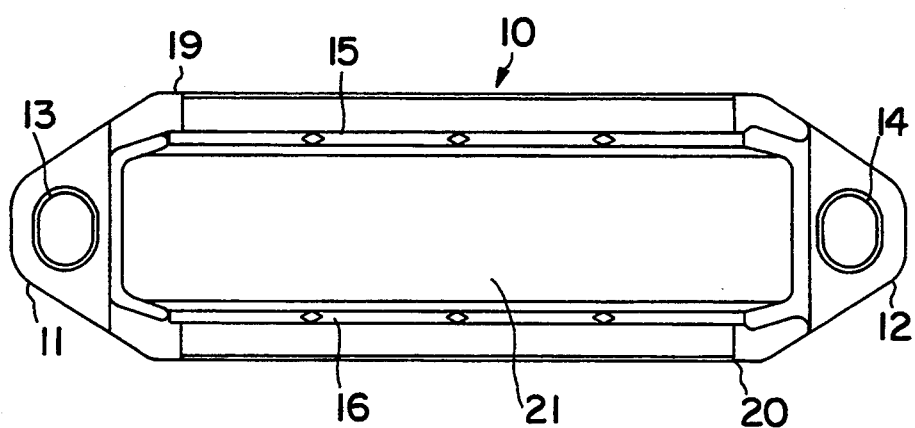
FIG. 2 is a bottom plan view of the coupling half.
Figure 3:
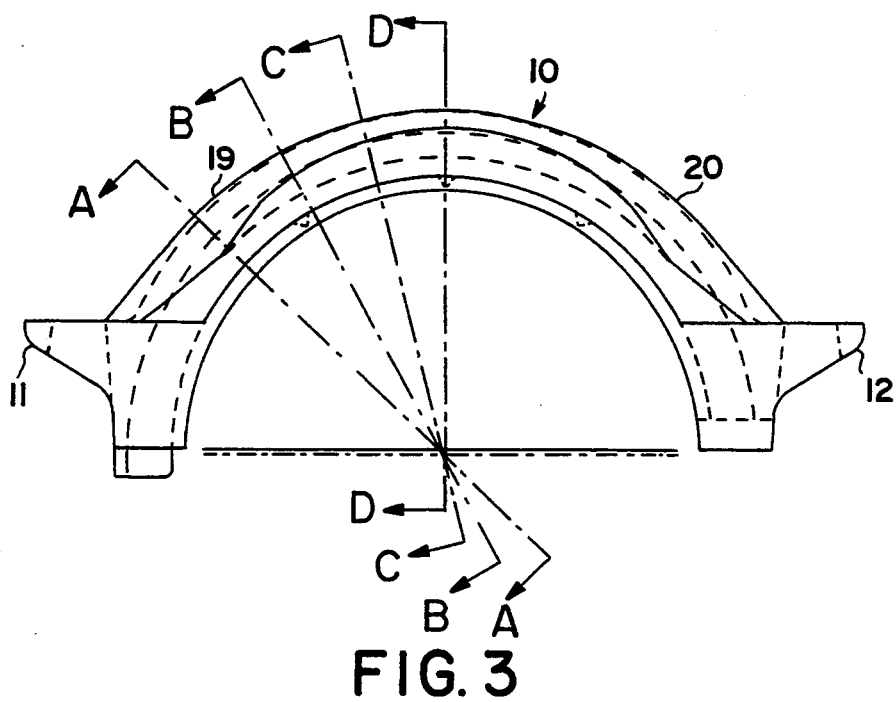
FIG. 3 is a side view of a coupling half, as viewed axially along a pipe to be coupled.

A pipe collar half according to the invention is illustrated generally as 10 in FIGS. 1, 2 and 3. Two of the coupling halves 10 are opposed on opposite diametrical sides of the ends of pipes to be coupled (not shown) and are urged together by bolts (not shown), in a manner generally known. Since the halves are exact duplicate of one another, it is unnecessary to depict each of the halves which comprise a coupling, and referring to FIG. 3, the lower collar half would appear identical to that shown, only rotated 180° and arranged under the upper collar half shown.

A collar half 10 includes a pair of tabs 11 and 12 located at the circumferential ends of collar half 10, generally protruding parallel to a diameter of the pipe. Collar half 10 is an arcuate structure having a distinct left half 19 and right half 20. Tabs 11 and 12 are provided with apertures 13 and 14. Apertures 13 and 14 enable passage of a fastening device therethrough for fastening a pair of collar halves together in an opposite, abutting relationship.

As clearly shown in FIG. 3, the collar half is substantially arcuate and semicircular so that when halves are assembled together, they define a circular opening for receiving the adjoining ends of a pair of pipe sections. Typically, in order to lock the pipe coupling in place over the adjoining ends of pipes, the pipes themselves are provided with circumferential grooves spaced axially from their respective terminal ends. As shown in FIG. 2, coupling half 10 is provided with a pair of ridges or tangs 15 and 16. Each of ridges 15 and 16 is adapted to engage the circumferential grooves on one of the pipe sections such that the pipe sections are fixed by the clamping coupling against relative displacement, axially, laterally and by transverse bending forces of the pipes relative to the joint. For example, ridge 15 engages the groove spaced axially from the terminal end of one pipe section while ridge 16 engages the groove of the adjoining pipe section. Of course the opposed collar half (not shown) engages the same grooves, which extend circumferentially around the pipe ends. In this manner, the pipe coupling is substantially locked in place over the adjoining ends of pipes whereby the pipe sections are rigidly fixed relative to one another. Ridges 15 and 16 define an annular opening 21 in collar half 10.

Forces on coupled pipes are concentrated at the point of connection between the pipes, due to the lever arm or moment arm defined by the pipe between the point of application of a transverse force and the point of potential flexing at the joint. A relative bending force on the coupled pipes is resisted by the coupling via the interaction of ridges 15 and 16 in each collar half with the grooves in the pipe, and by the fact that the ridges 15, 16 are fixed rigidly in position and are integral with the body of the coupling half. The bending moment at the pipe joint, however, can produce a substantial force on the collar halves. The force may be sufficient to deform the halves and destroy the couplings whereby the pipes disengage, with potentially catastrophic results. According to the invention the couplings are reinforced in a particular manner wherein the reinforcement is placed such that the strength of the reinforcement in local areas is inversely related to variations in local deforming forces occurring in use, for distributing the local deforming forces in a manner that best withstands external forces acting on the coupling.

In the preferred embodiment of the invention, the reinforcement is provided by wings 17 and 18. Wings 17 and 18 increase the rigidity of collar half 10. However, wings that are uniform throughout the radial length of a pipe coupling are disadvantageous in that they permit forces acting on the pipe coupling to concentrate, particularly at the center of the coupling halves, and especially because the circumferential ends of the halves are urged together in a direction parallel to a diameter of the pipe (along line D—D in FIG. 3). For this reason, the pipe coupling of the invention has wings 17 and 18 which are larger from as measured from a point near a circumferential end to a point at or near the center.

Figure 4:
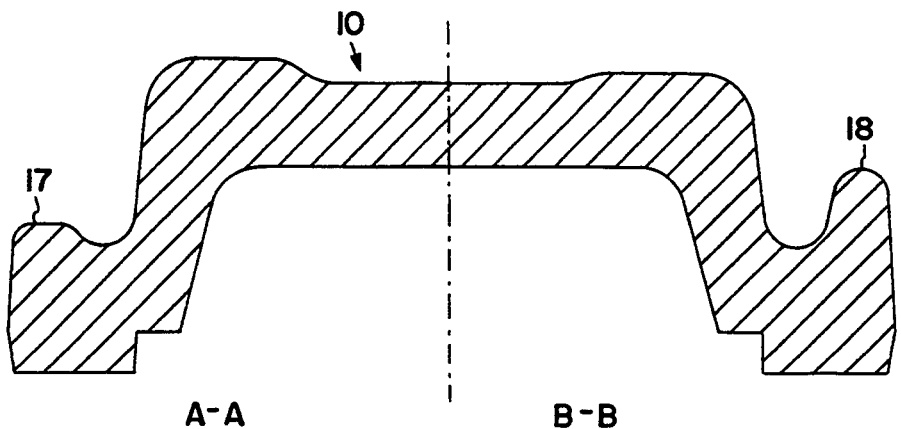
FIG. 4 is a split section view taken at lines A—A and B—B in FIG. 3.
Figure 5:
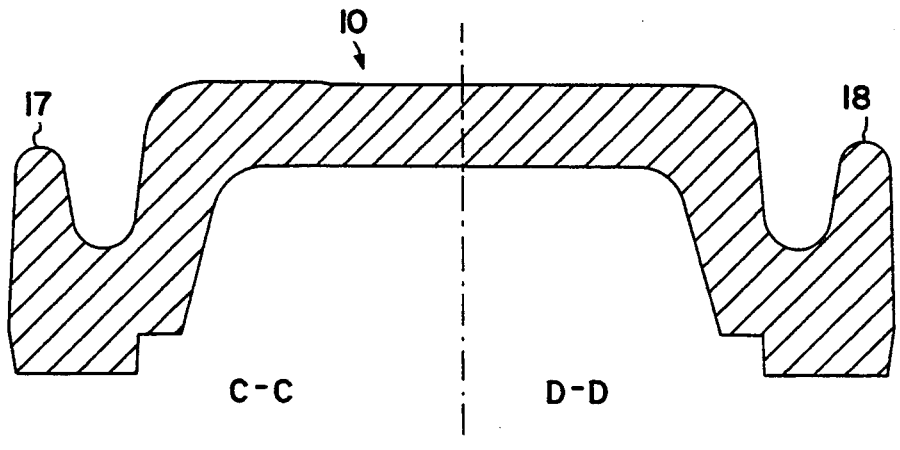
FIG. 5 is a split section view taken at lines C—C and D—D of FIG. 3.

The reinforcement provided by the wings 17, 18, varies with the radial height of the wings. As shown in FIGS. 3, 4 and 5, wings 17 and 18, shown in the respective split section views, have a defined height at cross-section AA, namely near a circumferential end of coupling half 10, that is relatively small as compared to the height of the wing at the other cross sections proceeding along the circumferential length of the coupling toward centerline D—D. Wings 17 and 18 gradually and uniformly increase in height from point AA to point BB, and in turn from point BB to CC and from point CC to DD, defining a smooth reinforcing arch at and adjacent the centerline of the clamping half 10. The right hand side 20 of collar half 10 is a mirror image of the left hand side 19 of collar half 10, so that the wings 17 and 18 are equal in height at points equidistant from center line DD and/or tabs 11 and 12.

Whereas the extent of reinforcement is greater where the wings 17, 18 are radially higher, and vice versa, the collar half 10 is most heavily reinforced at midpoint DD, and smoothly reinforced by a lesser extent proceeding to a minimum at point AA. This design for collar half 10 has the effect of distributing any external forces acting on the collar. The local deforming forces occurring in the collar half resulting from external forces acting on the collar half occur unequally, and are distributed in inverse relation to the locations where they occur, such that any deformation is distributed equally throughout the circumference collar half 10. As a result, the ridges or tangs 15, 16 are held in the pipe grooves substantially equally around the circumference of the pipe, rather than being prone to disengage their grooves, especially at the center of collar half 10.

While there is shown and described herein certain specific structure embodying this invention, it will be apparent to those skilled in the art that various modifications and rearrangements of the parts may be made without departing from the scope and spirit of the inventive concept. The invention is not limited to the precise arrangements disclosed as examples, and reference should be made to the appended claims in order to assess the scope of the invention in which exclusive rights are claimed.

What I claim is:

1. A pipe coupling for joining adjoining ends of pipes, comprising:
   a pair of oppositely disposed arcuate collar halves, each of said collar halves having an integral body defining inner and outer sides and a length, the inner sides having a pair of parallel ridges disposed on axial ends of said halves, the ridges being adapted for reception in a respective groove on each of the adjoining pipe ends;
   a pair of connecting tabs, each of said tabs defining an extension extending radially adjacent respective circumferential ends of said collar half; and,
   a pair of parallel wings extending radially outwardly from and substantially traversing a circumferential length of said collar half along axial boundaries of the body, and wherein the wings vary in radial height along the circumferential length;
   wherein each said wing is relatively smaller in height near the circumferential ends, adjacent said tabs, and relatively larger in height at a point in a center of said collar half.

2. The pipe coupling of claim 1, wherein said wings vary smoothly in radial height from point to point traversing the outer side of said half.

3. The pipe coupling of claim 1, wherein said wings continuously increases in height from said points near said circumferential ends adjacent said tabs to said point in the center, forming a reinforcing arch.

4. The pipe coupling of claim 3, wherein said continual increase is uniform.

5. The pipe coupling of claim 1, wherein said tabs are provided with bolt holes for receiving fasteners operable to urge said collar halves together about adjoined ends of pipe.

6. The pipe coupling of claim 1, wherein said coupling is an integral casting.

7. The pipe coupling of claim 1, wherein said wings vary in height in proportion to an extent of local deforming forces occurring in the collar halves which result from any external force acting on the collar halves, such that an unequal distribution of the local deforming forces around the circumferential length of each collar half produces a substantially equal extent of deformation in that collar half.

8. A collar half for a pipe coupling, comprising:
   an arcuate, semi-circular, body having a circumferential length, an outerside and an underside, each of said outerside and underside defining axially disposed boundaries and circumferentially disposed ends;
   a pair of parallel ridges on the body, one of each of said pair of ridges disposed on the underside of said collar half substantially adjacent said axially disposed boundaries, said ridges substantially traversing the circumferential length of the collar half;

a pair of tabs, one of each of said pair of tabs depending radially outwardly from said circumferential disposed ends of said collar half;

a pair of parallel wings, one of each of said pair of wings disposed on the outerside of said collar half at said axially disposed boundaries, said wings substantially traversing the circumferential length of the outerside of the collar half, said wings having varying height along the circumferential length of the half;

wherein said wings are smallest in height at points adjacent the circumferentially disposed ends and largest in height at a point in a center of said collar half.

9. The collar half of clam 8, wherein said wings vary in height from point to point traversing the length of the outerside of the collar half.

10. The collar half of claim 8, wherein said wings continuously increase in height from said points adjacent said circumferentially disposed ends to said point in the center of the collar half.

11. The collar half of claim 10, wherein said continual increase is uniform.

12. The collar half of claim 8, wherein said tabs are provided with apertures for accepting fastening members for urging a pair of collar halves together.

13. The collar half of claim 8, wherein said collar half is an integral casting.

14. The collar half of claim 8, wherein said wings vary in height in proportion to an extent of local deforming forces occurring in the collar halves which result from any external force acting on the collar halves, such that an unequal distribution of the local deforming forces around the circumferential length of each collar half produces a substantially equal extent of deformation in that collar half.

* * * * *

UNITED STATES PATENT AND TRADEMARK OFFICE
CERTIFICATE OF CORRECTION

PATENT NO. : 5,354,108
DATED : October 11, 1994
INVENTOR(S) : Joseph J. Sandor

It is certified that error appears in the above-indentified patent and that said Letters Patent is hereby corrected as shown below:

Column 3, line 54, insert ---of--- after "distribution".

Signed and Sealed this

Twenty-third Day of May, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,354,108
DATED : October 11, 1994
INVENTOR(S) : Joseph J. Sandor

It is certified that error appears in the above-indentified patent and that said Letters Patent is hereby corrected as shown below:

Column 3, line 48, delete "forces" and replace with --local deforming forces occurring in the collar half which are the natural results of external forces acting--.

Column 3, lines 51-53, delete "occurring in the collar half which are the natural results of external forces acting".

Column 3, line 54, delete "local deforming", and insert --of-- after "distribution".

Signed and Sealed this

Tenth Day of October, 1995

*Attest:*

BRUCE LEHMAN

*Attesting Officer*   *Commissioner of Patents and Trademarks*